United States Patent
Nickel et al.

(10) Patent No.: US 12,348,097 B2
(45) Date of Patent: Jul. 1, 2025

(54) METHOD FOR ELECTRICALLY CONTACTING AT LEAST ONE ENAMELED COPPER WIRE WITH A COMPONENT OF AN ELECTRIC MOTOR, GENERATOR, SENSOR OR ELECTROMAGNET BY MEANS OF ELECTRICAL CONTACTS FORMED ON THE ENAMELED COPPER WIRES AND ADDITIONAL POTTING

(71) Applicant: Nidec GPM GmbH, Merbelsrod (DE)

(72) Inventors: Conrad Nickel, Troistedt (DE); Jakob Schnitzer, Hilburghausen (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 458 days.

(21) Appl. No.: 17/725,239

(22) Filed: Apr. 20, 2022

(65) Prior Publication Data

US 2022/0344996 A1 Oct. 27, 2022

(30) Foreign Application Priority Data

Apr. 21, 2021 (DE) .......................... 102021110073.9

(51) Int. Cl.
*H02K 3/28* (2006.01)
*H02K 3/30* (2006.01)
*H02K 5/22* (2006.01)
*H02K 11/33* (2016.01)

(52) U.S. Cl.
CPC ................ *H02K 3/28* (2013.01); *H02K 3/30* (2013.01); *H02K 5/225* (2013.01); *H02K 11/33* (2016.01)

(58) Field of Classification Search
CPC H02K 3/28; H02K 3/50; H02K 3/522; H02K 3/18; H02K 3/38; H02K 3/34; H02K 3/47; H02K 15/12; H02K 15/095; H02K 15/0068; H02K 5/225
See application file for complete search history.

(56) References Cited

U.S. PATENT DOCUMENTS

| | | |
|---|---|---|
| 5,960,540 A | 10/1999 | Pentz |
| 6,628,023 B1 | 9/2003 | Paquet |
| 8,896,170 B2 * | 11/2014 | De Filippis ............ H02K 3/522 310/179 |
| 2016/0094106 A1 | 3/2016 | Yamasaki |
| 2017/0257001 A1 | 9/2017 | Kamiya et al. |

(Continued)

FOREIGN PATENT DOCUMENTS

| | | |
|---|---|---|
| DE | 699 06 915 T2 | 12/2003 |
| DE | 10 2011 088 697 A1 | 6/2013 |

(Continued)

*Primary Examiner* — Bryan R Perez
(74) *Attorney, Agent, or Firm* — Keating & Bennett, LLP

(57) ABSTRACT

A method of electrically contacting at least one enameled copper wire, which forms a winding carried by a first component, with a second component of an electric motor, generator, sensor or electromagnet. The method includes forming at least one wire end of the at least one enameled copper wire into an electrical contact, positioning the electrical contact in a molding process, a molding compound formed in the molding process at least partially surrounds the first component and the at least one wire end, and contacting the electrical contact with the second component.

15 Claims, 4 Drawing Sheets

(56) References Cited

U.S. PATENT DOCUMENTS

| | | | |
|---|---|---|---|
| 2018/0219449 A1 | 8/2018 | Yamamoto | |
| 2019/0245406 A1* | 8/2019 | Horng | H02K 15/33 |
| 2020/0185997 A1* | 6/2020 | Hirasawa | H02K 7/14 |

FOREIGN PATENT DOCUMENTS

| | | |
|---|---|---|
| DE | 10 2015 217 441 A1 | 3/2016 |
| DE | 10 2015 104 707 A1 | 9/2016 |
| DE | 11 2015 002 671 T5 | 2/2017 |
| DE | 10 2018 201 331 A1 | 8/2018 |
| DE | 10 2020 117 056 A1 | 12/2020 |
| EP | 1 973 200 A1 | 9/2008 |
| JP | 2000-078804 A | 3/2000 |
| JP | 2011-114979 A | 6/2011 |

* cited by examiner

METHOD FOR ELECTRICALLY CONTACTING AT LEAST ONE ENAMELED COPPER WIRE WITH A COMPONENT OF AN ELECTRIC MOTOR, GENERATOR, SENSOR OR ELECTROMAGNET BY MEANS OF ELECTRICAL CONTACTS FORMED ON THE ENAMELED COPPER WIRES AND ADDITIONAL POTTING

CROSS REFERENCE TO RELATED APPLICATION

The present application claims priority under 35 U.S.C. § 119 to German Application No. 10 2021 110 073.9 filed on Apr. 21, 2021, the entire contents of which are hereby incorporated herein by reference.

FIELD OF THE INVENTION

The present disclosure relates to a method of electrically contacting at least one enameled copper wire to a component of an electric motor, generator, sensor, or electromagnet, and to an electric motor made using such a process.

BACKGROUND

For the electrical contacting of enameled copper wire arranged in windings with a component of an electric motor, generator, sensor, or electromagnet, it is known to use contact plugs or to solder or weld the wire ends.

SUMMARY

The present disclosure is based on the task of simplifying contacting and making it process-safe.

This task is solved by a method for electrical contacting of at least one enameled copper wire with a component of an electric motor, generator, sensor or electromagnet.

The term "enameled copper wire" refers to a wire made of a copper alloy that is surrounded by an electrically insulating enamel layer.

Accordingly, an example embodiment of the present disclosure provides a method of electrically contacting at least one enameled copper wire, which forms a winding carried by a first component, with a second component of an electric motor, generator, sensor or electromagnet. The method includes a) forming at least one wire end of the at least one enameled copper wire into an electrical contact, b) positioning the electrical contact in a molding process, the molding compound formed in the molding process at least partially surrounds the first component and the at least one wire end, and c) contacting the electrical contact with the second component.

Contacting is therefore particularly simple and space-saving. In addition, heat can be efficiently dissipated via the molding compound formed in the molding process. In addition, the winding wire is preferentially heated during the forming process, which is accompanied by a removal of the insulation of the wire, whereby the process of stripping the insulation can be saved.

The molding process can be injection molding, classical potting, vacuum potting or transfer molding.

The electrical contact is preferably a plug-in contact. The plug contact is preferably a press-fit contact. However, a round plug, flat plug or other contour can also be used, which is inserted into the second component for electrical contacting.

It is advantageous if the at least one wire end is strengthened by mechanical strengthening, in particular twisting, and/or by a surface treatment so that a reliable electrical connection to the second component can be established. In the case that both strengthening methods are used, it is advantageous if the coated wire ends are cold-formed to achieve the necessary hardness and spring stiffness. In this case, work hardening is preferably carried out by torsion and then a press-fit contour is stamped and/or punched.

In one example embodiment of the present disclosure, the method is designed for making electrical contact between an armature winding of an armature and a commutator of a brushed electric motor, the armature winding being formed by means of at least one enameled copper wire, the wire end of which is formed into an electrical contact in a), and in b) the armature with the wire end is at least partially surrounded by the molding compound, and in c) the electrical contact is made with the commutator.

To accumulate material to form the electrical contact, it is advantageous to fold back the winding wire end and thus use the double wire cross-section to form.

In another example embodiment of the present disclosure, the method electrically contacts a stator of an electric motor including a printed circuit board, with the stator including a stator core and coils of the enameled copper wire wound on the stator core, and in a) the at least one wire end belonging to a common phase is formed into an electrical contact, and in b) the electrical contact is connected to the stator, the molding compound formed in the molding process at least partially surrounding the at least one wire end and the stator, and in c) the electrical contact is contacted to the printed circuit board.

This has the advantage that separate electrical wiring in the form of a busbar unit is not necessary.

Depending on the number of slots and winding scheme, the winding wire ends can belong to a common phase. In case two winding wire ends belong to one phase, they are preferably twisted together around a longitudinal axis and form a common electrical contact extending in the longitudinal direction of the stator.

If only one winding wire end is provided per phase, it is preferably twisted about a longitudinal axis and forms an electrical contact extending in the longitudinal direction.

Preferably, in b), at least two longitudinally extending guide pins are formed on the upper side of the stator, which serve to center the printed circuit board on the upper side of the stator in c).

According to another example embodiment of the present disclosure, an electric motor includes a first component carrying windings of enameled copper wire including wire ends and a second component electrically contacted with the wire ends of the windings, at least one wire end defining an electrical contact contacting the second component, the electrical contact being held in position on the first component.

The above-mentioned advantages result.

The electrical contact is preferably formed as described above.

In one example embodiment of the present disclosure, the electric motor includes a commutator with a through bore extending in the longitudinal direction, via which the commutator is fixed against rotation on an armature shaft of the electric motor, and an armature body supported by the armature shaft, the windings of the enameled copper wire are on the armature body. The electrical contact electrically contacts the windings with the commutator, and the electrical contact is held in position on the armature body including the windings by the molding process.

In another example embodiment, the electric motor includes a rotor which is mounted rotatably about an axis of rotation, a stator, the stator including a stator core and coils wound on the stator core, the coils defining the windings, and a printed circuit board, at least one wire end of each phase being defined in an electrical contact contacting the printed circuit board, the electrical contact being held in position on the stator.

It is quite generally advantageous if the electrical contacts protrude from the molding compound formed in the molding process. Sealing in the molding process is preferably achieved in the mold itself or by geometries at the winding wire end.

In the case of the brushless electric motor, the molding compound formed in the molding process preferably completely surrounds the stator surface except for the electrical contacts. It may also be provided that at least two longitudinally extending guide pins are formed in the molding process on the upper side of the stator. These guide pins center the printed circuit board on the upper side of the stator.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the disclosure are explained in more detail below with reference to the drawings. Similar or similarly acting components are designated in the figures with the same reference signs.

DETAILED DESCRIPTION

Figure 1:
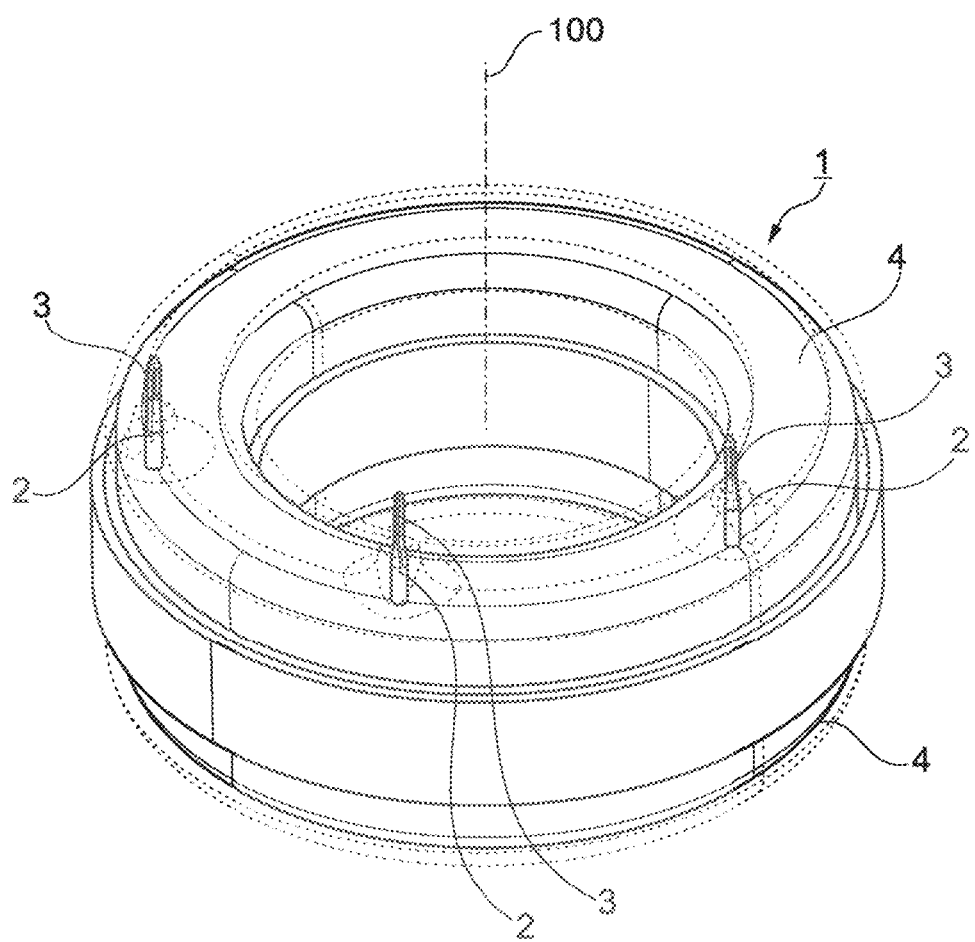
FIG. 1 shows a spatial view of a stator of a brushless electric motor according to an example embodiment of the present disclosure.

FIG. 1 shows a stator 1 which is part of a brushless DC motor. The stator 1 surrounds a rotor not shown and extends coaxially with the axis of rotation of the rotor, which in the assembled state corresponds to the longitudinal axis of the stator 100. The stator 1 has stator core segments, not shown, around each of which coils are wound. The windings of the coils are preferably wound in three phases, the windings being formed from a winding wire having winding wire ends 2. The winding wire ends 2 protrude from an upper side of the stator 1 at the end face. In the case shown, one winding wire end 2 belongs to each phase. The three winding wire ends 2 are formed at the ends in such a way that they form a press-fit contact 3, which is provided for forming an electrical connection with the printed circuit board. The press-fit contact 3 extends in the longitudinal direction.

The stator 1 is surrounded by molding compound 4 in a molding process. Shown here is the formation in an injection molding process. The molding compound or potting compound 4 is preferably formed from plastic, in particular thermoplastics and thermosets, for example epoxy resin. As shown in FIG. 1, the top and bottom of the stator are fully overmolded. The holding of the windings, in particular the position of the winding wire ends 2, is taken over by the potting compound 4 which surrounds the stator 1.

Figure 2:
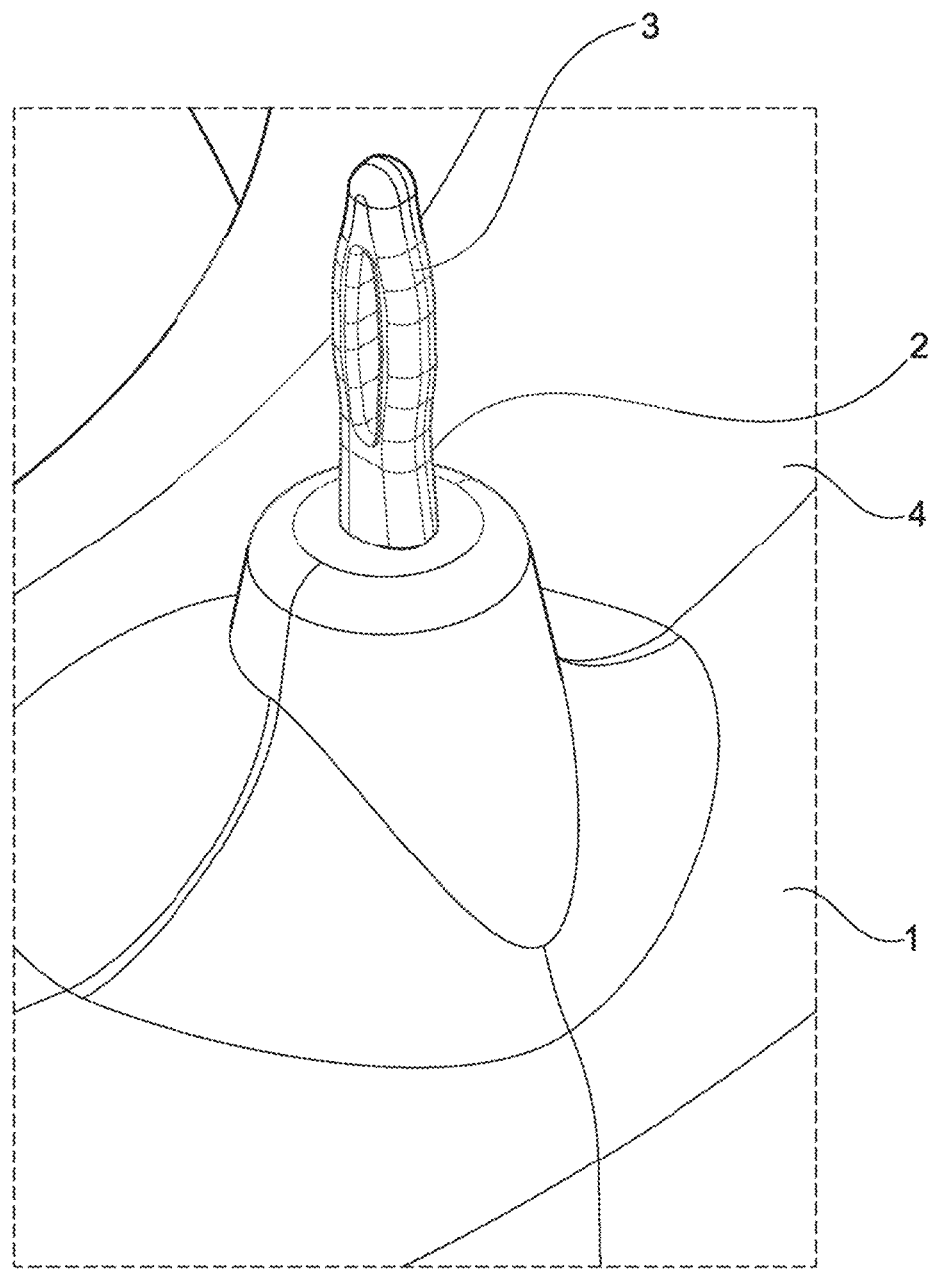
FIG. 2 shows a detailed view of FIG. 1 showing a connector for connecting a winding wire end of the stator to a printed circuit board.

FIG. 2 shows a section of the stator 1 of FIG. 1 in greater detail with a press-fit contact 3. Only the press-fit contact 3 protrudes upward from the potting compound 4.

The potting enables better thermal dissipation of the power loss of the windings, since the plastic conducts heat better than air. The sealing of the potting volume towards the press-fit contact 3 can be achieved by the holding tool during potting itself or by geometries at the end of the winding wire. Preferably, a geometry is provided below the press-fit contact 3 which can be easily gripped and enclosed in the holding tool so that the press-fit contact 3 is not overmolded.

Press-fit contacts 3 require sufficient spring stiffness for a secure press-fit printed circuit board or control unit connection. To increase the strength at the winding wire end 2, this can be additionally treated, e.g. by mechanical strengthening such as torsion and/or by an appropriate surface treatment, in particular by coating with tin. In the event that both strengthening methods are used, it is advantageous if the tin-coated winding wire ends are cold-formed to achieve the necessary hardness and spring stiffness. Preferably, this involves strain-hardening by torsion and then stamping a press-fit contour. The resulting press-fit contact has good springback properties. The temperatures during forming result in the removal of the wire's insulation, which saves the process of stripping the insulation.

It is also conceivable that the hardness of the plug-in contact is influenced by the choice of material for the copper wire or the copper alloy used for it. The contours of the press-fit contacts can be designed as a pinhole, as shown, or by notching on both sides.

To accumulate material for forming the contact, it is advantageous to fold back the winding wire end and thus use the double wire cross-section for forming.

The positioning of the formed plug contacts takes place in the forming tool.

Figure 3:
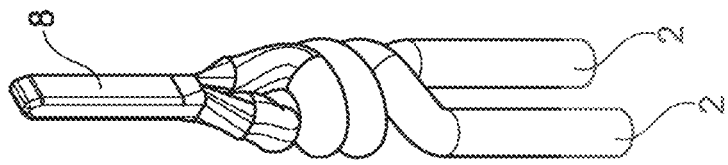
FIG. 3 shows a spatial representation of various fasteners according to example embodiments of the present disclosure.
Figure 3:
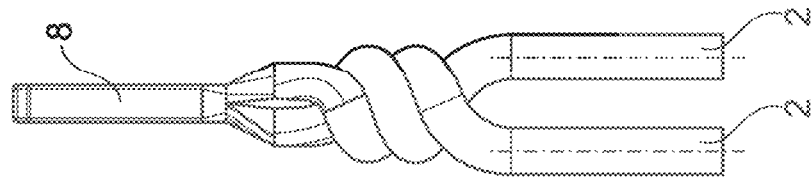
Figure 3:
Figure 3:
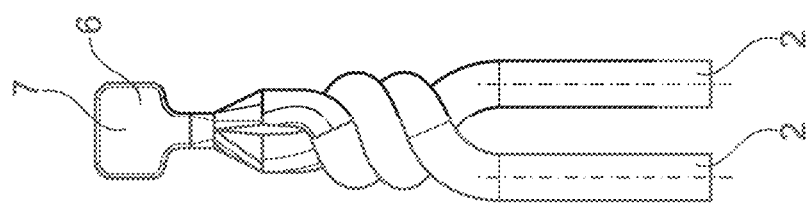
Figure 3:
Figure 3:

FIG. 3 shows three example embodiments of an electrical contact. Depending on the number of slots and the winding scheme of the electric motor, two or three wires can also be connected and formed into an electrical contact. In FIG. 3, two winding ends 2 are formed into a common electrical contact by plastic deformation, e.g. pressing, compression molding, stamping or the like.

The first two, left-hand illustrations show a plug-in contact in the form of a press-fit contact 3 in two different views. Two winding wire ends 2 are twisted together about a longitudinal axis. At the end, the press-fit contact 3 is formed with a needle eye contour 5 extending in the longitudinal direction. The press-fit contact 3 can be inserted into the printed circuit board and establishes an electrical connection therewith. No further components or process steps such as soldering are necessary.

The two illustrations in the center show a classic knife contour 6 for welded contacts on printed circuit boards. Here, too, two winding wire ends 2 are twisted together around a longitudinal axis and formed at the end into a rectangular flat contact surface 7. This contact surface 7 can be attached to the printed circuit board by means of a welding process.

The last two right-hand illustrations show a plug-in contact with a plug pin contour 8. The two winding wire ends 2 are twisted together about a longitudinal axis and formed in their end into a pin which extends in the longitudinal direction. The pin can then be inserted and contacted, for example, in a corresponding soldered-on preferably resilient socket of the printed circuit board. In contrast to the press-fit contour 3, the forming of the winding wire ends 2 is simplified and the connection is suitable for higher electrical currents.

Figure 4:
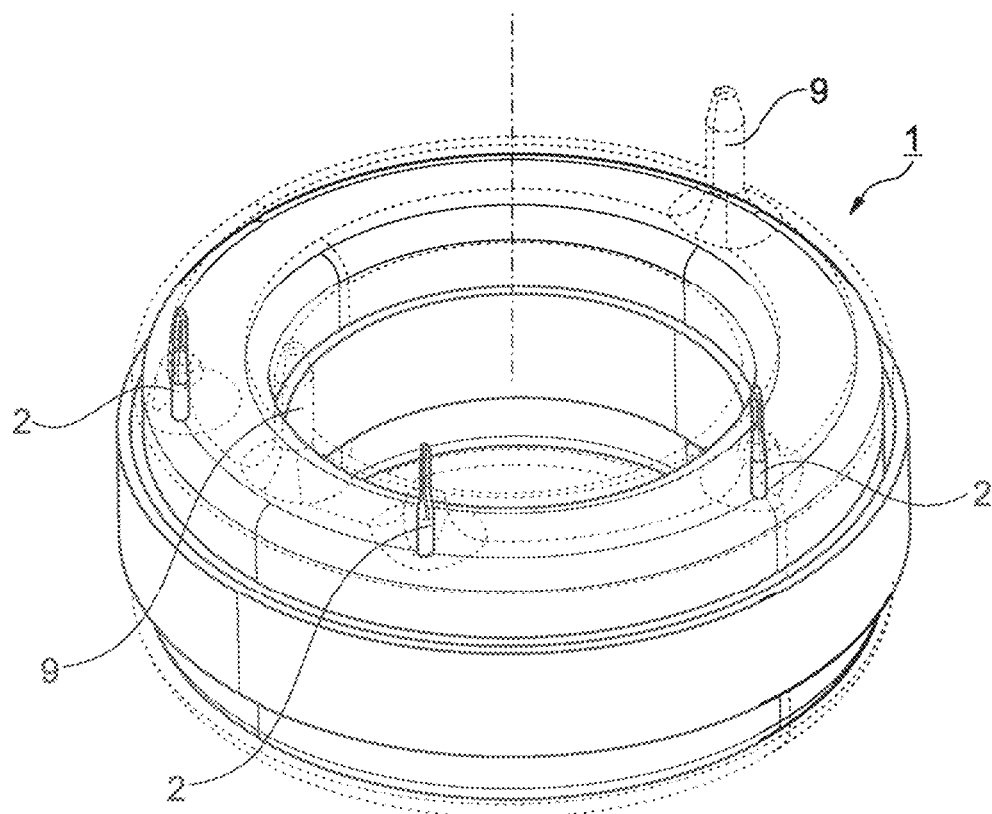
FIG. 4 shows a spatial view of another stator of a brushless electric motor according to an example embodiment of the present disclosure.

FIG. 4 shows another example embodiment of a stator 1, in which, in contrast to the stator of FIG. 1, two guide pins 9 were additionally formed on the upper side of the stator by injection molding. The guide pins 9 serve to center the printed circuit board on the upper side of the stator. This allows the tolerance chain for positioning the printed circuit board to be reduced. The guide pins 9 can have an abutment shoulder as an axial stop. The guide pins 9 are formed in a process step in the molding process together with the overmolding or potting of the winding wire ends 2.

For positioning the printed circuit board, a contact shoulder can also be formed on the contacts as an axial stop.

In another example embodiment, the type of electrical contact described above is used in brushed electric motors. These electric motors comprise a commutator which, in the usual manner, has a longitudinal axis with a through-hole extending in the longitudinal direction, via which the commutator is fixed against rotation on an armature shaft of the electric motor. The armature shaft carries an armature or rotor body having an armature winding with a plurality of wire windings inserted in slots in the rotor body. The wire windings are formed from enameled copper wire.

On its circumferential surface, the commutator has a large number of commutator bars arranged at uniform angular intervals from one another and concentric with a longitudinal axis of the commutator. On the side of the commutator bars facing the armature windings, these each have a contact element. The contact elements are conventionally used to connect the armature windings to the commutator bars in an electrically conductive manner, in particular by a soldering or welding process. On the side of the commutator bars facing away from the armature windings, the commutator bars interact with brush elements in a known manner.

According to the disclosure, the contact elements are connected to the wire windings by means of the formed wire ends. For this purpose, the wire end is formed as described above and an electrical contact is formed. Preferably, to accumulate material for forming the electrical contact, the winding wire end is folded back so that twice the wire cross-section is available for forming. Preferably, the electrical contact is a press-fit contact.

In the molding process, the armature body is surrounded by the armature windings and at least partially by the molding compound formed in the molding process. The electrical contact remains free and protrudes from the molding compound, as previously described. The electrical contact can then be directly connected to the commutator. Depending on the type of electrical contact, it is conceivable that the contact is welded to the commutator or, for example, inserted into a corresponding contact element when press-fit contacts are used.

This type of electrical contacting allows the wire ends of the armature windings to be contacted or connected to the contact elements by machine, which is safe and reliable. In addition, this type of connection is particularly space-saving.

The electrical contacting as described can also be used more generally in generators, sensors, or electromagnets.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A method of electrically contacting at least one enameled copper wire forming a winding carried by a first component with a second component of an electric motor, generator, sensor or electromagnet, the method comprising:
   a) strengthening of at least one wire end of the at least one enameled copper wire by mechanical processing and/or surface treatment;
   b) forming the at least one wire end into an electrical contact;
   c) positioning the electrical contact in a forming process, wherein a forming compound formed in the forming process at least partially surrounds the first component and the at least one wire end; and
   d) contacting the electrical contact with the second component; wherein
   the electrical contact is a single projection which extends longitudinally in a straight line to define a plug-in contact which is inserted into the second component.

2. The method according to claim 1, wherein
   the method makes electrical contact between an armature winding of an armature and a commutator of a brushed electric motor;
   the armature winding is defined by the at least one enameled copper wire, the wire end of which is formed into an electrical contact in b);
   in c) the armature with the wire end is at least partially surrounded by the forming compound; and
   in d) the electrical contact is made with the commutator.

3. The method according to claim 1, wherein
   the method makes electrical contact between a stator of an electric motor and a printed circuit board;
   the stator includes a stator core and coils of the at least one enameled copper wire wound on the stator core;
   in b) the at least one wire end belonging to a common phase is formed into an electrical contact;
   in c) the electrical contact is connected to the stator, the forming compound formed in the forming process at least partially surrounding the at least one wire end and the stator; and
   in d) the electrical contact is contacted to the printed circuit board.

4. The method according to claim 3, wherein
   in c) at least two longitudinally extending guide pins are formed on an upper side of the stator; and
   in d) the guide pins are used to center the printed circuit board on the upper side of the stator.

5. The method according to claim 1, wherein
   the strengthening of the at least one wire end by mechanical processing and/or surface treatment includes a cold forming process.

6. The method according to claim 1, wherein
   in d) the electrical contact is directly press-fit into a portion of the printed circuit board.

7. An electric motor, comprising:
   a first component carrying windings of enameled copper wire including wire ends;
   a second component electrically contacted with the wire ends of the windings; and
   at least one wire end is defined as an electrical contact contacting the second component; wherein
   the electrical contact is held in position on the first component by a forming compound which is molded over at least a portion of the electrical contact with another portion of the electrical contact protruding out from a surface of the forming compound; and the forming compound is made of plastic;

the electrical contact is a single projection which extends longitudinally in a straight line to define a plug-in contact which is inserted into the second component; and the at least one wire end is strengthened by a portion that is mechanically hardened and/or surface treated.

8. The electric motor according to claim 7, further comprising:

a commutator including a through bore extending in the longitudinal direction via which the commutator is non-rotatably mounted on an armature shaft of the electric motor; and an armature body supported by the armature shaft; wherein the windings of the enameled copper wire are on the armature body;

the electrical contact electrically contacts the windings with the commutator; and the electrical contact is held in position on the armature body including the windings.

9. The electric motor according to claim 7, further comprising:

a rotor which is mounted rotatably about an axis of rotation;

a stator including a stator core and coils wound on the stator core defining the windings; and a printed circuit board, at least one wire end of each phase defined in the electrical contact contacting and the printed circuit board being the second component, the electrical contact being held in position on the stator, which is the first component.

10. The electric motor according to claim 9, wherein the electrical contacts of all phases protrude from a forming compound.

11. The electric motor according to claim 9, wherein the forming compound is molded over and surrounds the stator surface except for the electrical contacts of all phases.

12. The electric motor according to claim 9, wherein at least two longitudinally extending guide pins are defined in the forming compound on an upper side of the stator.

13. The electric motor according to claim 7, wherein two of the at least one wire ends are twisted together about a longitudinal axis and define the electrical contact extending in the longitudinal direction.

14. The electric motor according to claim 7, wherein a wire end is twisted about a longitudinal axis and defines the electrical contact extending in a longitudinal direction.

15. The electric motor according to claim 7, wherein the plastic of the forming compound is epoxy resin.

* * * * *